3,471,451
METHOD OF MAKING POLYAMIDES FROM HYDROXY AMIDES
Leslie D. Moore, Lisle, Ill., assignors to Nalco Chemical Company, Chicago, Ill., a corporation of Delaware
No Drawing. Filed Apr. 1, 1966, Ser. No. 539,331
Int. Cl. C08g 20/04
U.S. Cl. 260—78       1 Claim

---

ABSTRACT OF THE DISCLOSURE

A method for preparing polyamides which comprises heating a compound selected from the group consisting of $$HO-CH_2CH_2-CONH_2$$

and $$HO-CH_2CH_2-CONH_2$$
$$\phantom{HO-CH_2}|$$
$$\phantom{HO-CH_2}CH_3$$

to a temperature of at least 150° C. to effect intermolecular dehydration of the compound to form the polyamide.

---

This invention relates to a novel method for preparing polyamides by intermolecular dehydration. More particularly, the invention relates to a method for preparing polyamides from compounds having the formula HO—R—CONH$_2$ by means of intermolecular dehydration, resulting in products which belong to the nylon family of compounds.

Synthetic polymer amide compounds which have recurring amide groups in the main polymer chain have been of significant interest to the fiber and fabric industry since the development of nylon in the 1930's. Initial work by W. H. Carothers led to the development of a number of polyamide resins commercially known as nylon. Considerable interest has centered around the nylon type compounds. The most common nylon is nylon-6,6 which is prepared by condensation of hexamethylenediamine and adipic acid. In fact, a wide variety of nylons are prepared using different diamines and different carboxylic acids to give an entire family of similar nylon compounds.

Polyamides may be informally classified chemically into a number of classes. These are: those made by polymerizing lactams; those made by condensation of a diamine with a dibasic acid, to give a product of high molecular weight; polyamides made by self-condensation of amino acids; vegetable oil-based polyamide resins; reactions of dinitriles with ditertiary glycols or their esters; reactions of dinitriles with formaldehyde in the presence of strong acids; and anionic polymerization of acrylamide. While each of these chemical classes of nylons have their own particular values, recent interest has centered around nylon-3, which is also called poly(beta-alanine) since this compound is more similar to nature's fibers (e.g., silk and wood, which have a 2 carbon backbone). Nylon-3 is said to have a better "hand" than most other nylons and is expected to have better water absorptivity and dyeability characteristics than many other nylons. Further, the high melting point of nylon-3 is expected to prove advantageous in a number of market areas.

Nylon-3 is currently known to be prepared by anionic polymerization of acrylamide. However, a number of drawbacks to this method are known. The polymerization results in relatively low molecular weight, and the solvent, acrylamide and catalyst must all be very dry and extremely pure in order for any polymerization to occur. It would be of great value to the art if a simple and effective process for preparing nylons could be found.

It would particularly be advantageous if a method for readily preparing nylon-3 could be developed.

Accordingly, it is an object of this invention to provide a new and useful process for preparing polyamides. Another object of this invention is to provide a process whereby polyamides of the nylon-3 type may be prepared.

In accordance with the invention, a new process for preparing polyamides has now been discovered. Basically, the process comprises reacting a compound of the formula HO—R—CONH$_2$ at a sufficiently high temperature to effect intermolecular dehydration of said compound to form a polyamide. In a preferred embodiment of the invention, the divalent organic radical in the above formula, R, is either —CH$_2$CH$_2$— or $$-CH_2CH_2$$
$$\phantom{-CH_2}|$$
$$\phantom{-CH_2}CH_3$$

whereby the resulting polyamide has a structure which is commercially known as nylon-3.

The compounds which have been found to yield satisfactory polyamides by intermolecular dehydration and which have the above set forth formula may be characterized as being a compound which has a hydroxyl group, an amide group and an organic divalent radical which is attached to the hydroxyl and amide groups. Listed below in Table I are a few examples of the various divalent organic radicals which are suitable for practice in the process of this invention.

TABLE I

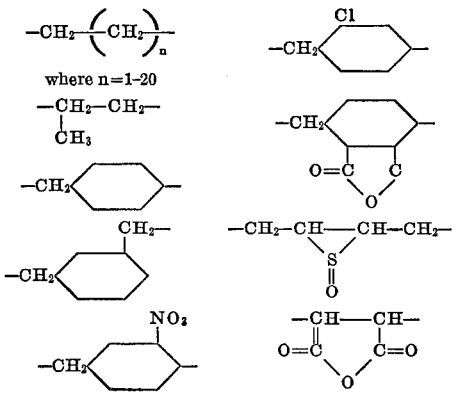

Particular preferred divalent organic radicals useful in the process of this invention are —CH$_2$CH$_2$— and $$-CH_2CH_2-$$
$$\phantom{-CH_2}|$$
$$\phantom{-CH_2}CH_3$$

When either of these divalent organic radicals are substituted into the above formula, the resulting compounds are known as hydracrylamide and hydramethacrylamide. These two compounds are especially preferred since they result in a formation of a nylon-3 type polyamide.

In its simplest aspect, the process of this invention comprises heating a compound having the above formula to a sufficiently high temperature to effect intermolecular dehydration of the compound to form a polyamide. Normally, to avoid competing side reactions and to obtain sufficient product in a reasonable length of time, it is necessary to heat to a temperature of at least 150° C. Preferred is to employ a temperature of at least 180° C. The particular temperature which is necessary to effect intermolecular dehydration will depend necessarily upon the particular compound employed in the process. Upper limits of this temperature will again be governed by the particular compound employed therein, since too high a temperature may result in charring of the polymer product. Catalysts may also be employed to increase the rate of reaction. For example, toluene sulfonic acid has been successfully employed.

In a preferred embodiment, the process of this invention may be carried out in an oxygen-free atmosphere, such as a nitrogen blanket, in order to prevent oxidation of the polymer which leads to a darkening of the resulting product color.

Another preferred embodiment of the process of the invention, which has been found to be highly suitable in preparing the polyamides described above, is to carry out the heating step by refluxing the compound in an organic liquid having a boiling point of at least 150° C. Examples of some of these organic liquids are isopropyl benzene, cyclohexanone, symmetrical dichloroethyl ether, diethylene glycol monoethyl ether, naphthalene, alpha-chloronaphthalene and a wide variety of other suitable solvents.

To demonstrate the efficiency of the process of this invention, an amount of hydracrylamide was placed in a volume of refluxing methyl naphthalene boiling at approximately 230° C. After approximately 1 hour, the stoichiometric amount of water was removed by azeotropic distillation. The resulting product was identified by infrared spectroscopy as nylon-3. The softening point of this polymer was above 270° C. and it was insoluble in most common solvents such as water, acetone, toluene, dimethyl sulfoxide, etc. The polymer was most nearly soluble in glacial acetic acid, a fact which again proves the nylon structure of the polymer.

It will be understood that numerous changes may be made in the particular details of the process of this invention without departing from the spirit of the invention, especially as defined in the following claim.

What is claimed is:

1. A method for preparing polyamides which comprises heating a compound selected from the group consisting of HO—$CH_2CH_2$—$CONH_2$ and

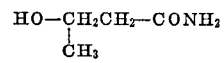

to a temperature of at least 150° C. to effect intermolecular dehydration of the compound to form the polyamide.

References Cited

UNITED STATES PATENTS

| | | | |
|---|---|---|---|
| 2,197,723 | 4/1940 | Hovey et al. | 260—78.3 |
| 2,466,854 | 4/1949 | Koch | 260—78 |
| 2,691,643 | 10/1954 | Chirtel et al. | 260—78 |
| 3,093,618 | 6/1963 | Graf et al. | 260—78 |
| 3,126,353 | 3/1964 | Lautenschlager | 260—2 |

HAROLD D. ANDERSON, Primary Examiner

U.S. Cl. X.R.

260—2, 78.3, 79.3

PO-1050
(5/69)

UNITED STATES PATENT OFFICE
CERTIFICATE OF CORRECTION

Patent No. 3,471,451      Dated October 7, 1969

Inventor(s) Leslie D. Moore

It is certified that error appears in the above-identified patent and that said Letters Patent are hereby corrected as shown below:

Column 2, line 38, Table 1, on the right side, that portion of the formula reading "C" should read '''C=O'''.

SIGNED AND
SEALED
FEB 24 1970

(SEAL)
Attest:

Edward M. Fletcher, Jr.
Attesting Officer

WILLIAM E. SCHUYLER, JR.
Commissioner of Patents